Aug. 20, 1968  P. W. DWYER ET AL  3,397,511
DESICCANT-TYPE AIR DRYER EMPLOYING HEAT FOR REACTIVATION
Filed March 31, 1965
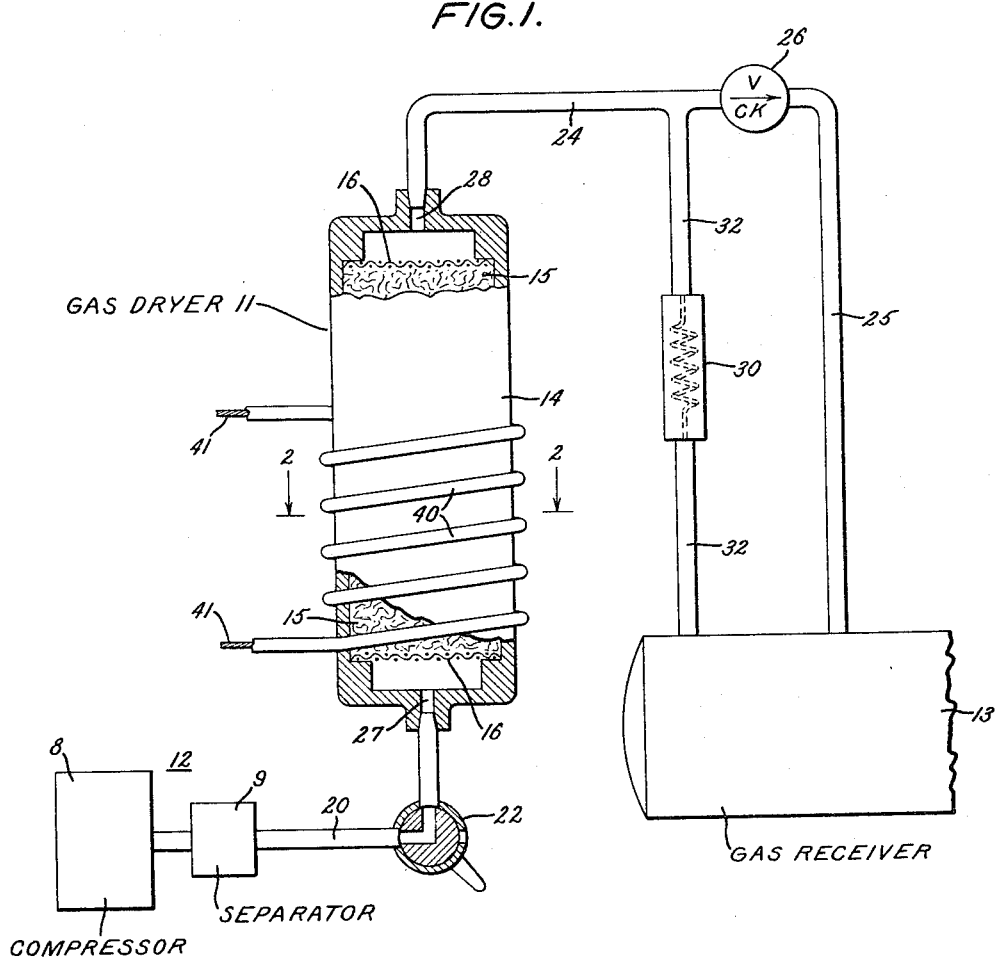
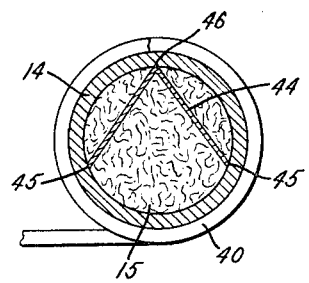
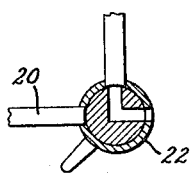
INVENTORS:
GEORGE L. COUCH,
PETER W. DWYER,
BY William Freedman
ATTORNEY

United States Patent Office 3,397,511
Patented Aug. 20, 1968

3,397,511
DESICCANT-TYPE AIR DRYER EMPLOYING HEAT FOR REACTIVATION
Peter W. Dwyer, Paoli, and George L. Couch, Media, Pa., assignors to General Electric Company, a corporation of New York
Filed Mar. 31, 1965, Ser. No. 444,261
5 Claims. (Cl. 55—196)

ABSTRACT OF THE DISCLOSURE

A heat-reactivated, desiccant-type air dryer in which operation can be transferred from reactivation to drying without requiring a time delay before drying is started. During reactivation, the upper region of the desiccant is maintained relatively cool and dry. Should it be necessary to transfer from reactivation to drying, this upper region will be in a condition to immediately adsorb moisture from the air passing upwardly therethrough during drying.

---

This invention relates to an air dryer that employs a desiccant for adsorbing moisture from air passing therethrough and relates more particularly to a desiccant-type dryer in which the desiccant is periodically reactivated by heating it to release previously-adsorbed moisture.

Most dryers which employ heat for reactivation of the desiccant are subject to the disadvantage that the dryer cannot be used for drying purposes until a rather long period has elapsed between termination of the reactivation cycle and starting of the drying cycle. This time period has been necessary in order to permit the desiccant to cool sufficiently to regain its moisture-adsorbing properties. The reactivating heat had rendered the desiccant inoperable to retain or adsorb significant quantities of moisture, and this condition would prevail until sufficient cooling had occurred after termination of reactivation. If moist gas were passed through the dryer while the desiccant was still in its hot condition, the desired moisture-removal would not occur.

An object of our invention is to provide a heat-reactivated, desiccant-type dryer in which operation can be transferred from reactivation to drying without requiring a time delay before drying is started.

Another object is to construct the dryer in such a manner that this transfer from reactivation to drying can be performed at any point in a reactivation cycle without significantly interfering with the ability of the dryer to immediately produce dry air.

Another object is to provide a desiccant-type dryer of this type in which complete reactivation can occur in a time equal to or less than the drying time elapsing prior to reactivation.

In carrying out the invention in one form, we provide a vessel that contains a quantity of desiccant, such as silica gel. The vessel has an inlet opening located beneath the desiccant and an outlet above the desiccant. Air containing moisture enters the vessel through the inlet, passes upwardly through the desiccant, releasing its moisture to the desiccant, and then exhausts in a dried condition through the outlet. After the desiccant has been exposed to a predetermined amount of drying duty, the drying operation is stopped and the desiccant is reactivated. This reactivation is effected by moderately heating the desiccant while at the same time sending a stream of initially-dry air in a downward direction through it. The amount of heat applied to the desiccant is limited to an exceptionally low value that limits the temperature rise of the hottest portion of the desiccant to a value of less than about 100 degrees F. above ambient temperature. The moisture that is released by this moderate heating is removed from the desiccant in a downward direction by the downwardly-flowing reactivation stream.

In a preferred embodiment of the invention, a greater portion of the reactivation heat is applied to the lower regions of the desiccant than its uppermost regions. This, in combination with the downwardly-flowing reactivation stream, causes the temperature rise of the desiccant to be greater in its lower regions than in its uppermost regions. Since the temperature rise of even the lower regions is held to a relatively low value, the upper region of the desiccant remains quite cool and is thus available for high-efficiency drying duty should it be necessary to turn around from reactivation to drying without an intervening delay. The upper region of the desiccant is maintained sufficiently cool to allow this turn-around from reactivation to drying to occur without saturating the initial air output from the dryer. As a further measure of the coolness of the upper region of the desiccant, the relative humidity of the air output from the dryer is below 5 percent within five minutes of drying operation immediately following reactivation.

For a better understanding of our invention, reference may be had to the following description taken in conjunction with the accompanying drawings, wherein:

FIG. 1 is a schematic illustration of a drying system embodying one form of our invention. FIG. 1 depicts the parts during a drying cycle.

FIG. 2 is a sectional view taken along the line 2—2 of FIG. 1.

FIG. 3 illustrates a part of the system of FIG. 1 in the position it occupies during a reactivation cycle.

Referring now to FIG. 1, there is shown a desiccant-type dryer 11 interposed between a high pressure source 12 of wet air and a high pressure air receiver 13. The illustrated source 12 comprises a compressor 8 and a separator 9 of conventional construction for removing entrained liquid from the pressurized air leaving the compressor. The air leaving the separator will normally be at 100 percent relative humidity, i.e., saturated.

The dryer 11 comprises a pressurized vessel 14 containing a desiccant 15, such as silica gel. The desiccant 15 is held in place within the vessel 14 by suitable filtering screens 16 provided at the top and bottom of the desiccant. In a preferred embodiment, additional filters in the form of porous metal discs are provided adjacent the screens 16 to provide for additional filtering. For simplicity, however, these additional filters are not shown in the drawing. It will be apparent from FIGS. 1 and 2 that the vessel 14 and the desiccant body 15 each has a long vertical dimension in comparison to its horizontal dimension.

High pressure air can flow from the source 12 to the dryer through a line 20 containing a control valve 22. The control valve is shown as a three-way valve, but it should be understood that it can be of any other suitable conventional design. After flowing through the open control valve 22, the wet air enters the vessel 14 through an inlet opening 27 located beneath the desiccant 15. It then flows upwardly through the desiccant, transferring its moisture thereto, and exhausts in a dried condition through an outlet opening 28 located above the desiccant.

Thereafter, the dry air flows from the dryer 11 to the air receiver 13 via a high pressure line 24, 25. A check valve 26 in the portion 25 of this high pressure line prevents any backflow of air through this line portion 25.

In parallel-circuit relationship with the check valve 26 is a metering device 30, preferably constructed as shown and claimed in application S.N. 421,284 Couch, now Patent No. 3,343,340, filed Dec. 28, 1964, and assigned to the assignee of the present invention. This metering device 30, which is connected in a line 32, presents a relatively high resistance to flow therethrough and, thus, no significant amount of air flows therethrough during the drying operation.

After a prolonged period of drying duty, the desiccant 15 will have adsorbed a considerable amount of moisture and must be reactivated in order that its original moisture-adsorbing properties be restored. As a first step in accomplishing such reactivation, the control valve 22 is operated to the position of FIG. 3 where it vents the bottom of the dryer 11 to atmosphere but blocks flow through the line 20. Venting the bottom of the dryer 11 in this manner permits high pressure dry air to flow from the air receiver 13 into the dryer 11 via a path that extends through lines 32 and 24. The reactivating air enters the dryer through the upper opening 28, then passes downwardly through the desiccant 15, removing moisture therefrom and exhausting through the inlet opening 27 and control valve 22, which is then in its venting position of FIG. 3.

The flow of reactivating air is limited to a relatively low rate by blocking reverse flow through the normally-unrestricted line 25 by means of a check valve 26 and by thus forcing all of the reactivating air to find a path through metering device 30. Since the metering device 30 presents a high resistance to flow, it limits the flow of the reactivating air to the desired low value. In one specific embodiment of the invention, this flow rate is about 40 cubic feet per hour.

To assist in reactivating the desiccant 15, a heater 40 is provided. This heater 40 comprises a high resistance electrical conductor 41 wrapped about the vessel 14. A suitable insulating coating surrounds the conductor to prevent the vessel from short-circuiting the turns of the heater. The heater is energized by applying a suitable voltage of about 100 volts to its terminals. In a preferred embodiment of my invention, the normal electric power input into the heater when it is energized is about 150 watts. As will be apparent from FIGS. 1 and 3, the heater 40 is confined to the lower two-thirds, approximately, of the portion of the vessel 14 that carries the desiccant 15. Thus, when the heater 40 is energized, heat is directly applied only to the lower two-thirds of the desiccant.

To facilitate heat transfer from the heater 40 to the desiccant material 15, heat transfer elements 44 of a highly conductive metal such as aluminum are provided inside the vessel 14, which is preferably of steel. These heat transfer elements 44 are best shown in the sectional view of FIG. 2. They comprise thin aluminum strips or ribbons bent into a V-shape and having their ends 45 and vertex 46 bearing firmly against the internal walls of the vessel 14. Heat is readily conducted along the length of these highly conductive elements 44, thus facilitating its entry into the central regions of the desiccant. A plurality of these heat transfer elements 44 are stacked one atop the other, but, preferably, the heat transfer elements are provided only in the lower region of the desiccant where the heating element 40 is located. In view of the location of the heater 40 and the heat transfer elements 44, it will be apparent that a much greater portion of the output of the heater is applied to the lower region of the desiccant than to its uppermost regions.

When the temperature of the desiccant is increased by heat imparted to it from the heater 40, the desiccant releases its previously-adsorbed moisture, the rate of release varying directly with the local temperature of the desiccant and its moisture content. The previously-described stream of reactivating air, which flows downwardly through the desiccant, carries the released moisture downwardly through the opening 27 and out the open control valve 22, as depicted in FIG. 3.

Returning for the moment to a drying cycle, it is to be noted that when the drying cycle begins, the lowermost region of the desiccant is the principal moisture-adsorbing region since the moist air enters from the bottom of the dryer and transfers most of its moisture to the initially-encountered desiccant. As the drying operation continues, the principal moisture adsorbing region approaches saturation, and its leading edge gradually moves upwardly. The portion of the desiccant above the leading edge, however, is still relatively dry, and its moisture content is progressively less as the top surface of the desiccant is approached.

Upon the completion of a predetermined total amount of drying time composed of one or more drying periods, reactivation is begun. In a preferred form of the invention this total drying time is normally about five hours. At this time, the leading edge of the principal moisture-adsorbing region has typically advanced upwardly only a few percent of the total height of the desiccant body.

As pointed out above, reactivation is accomplished by energizing the heater and at the same time sending a stream of initially-dry air downwardly through the desiccant 15, this air passing downwardly through the above described principal moisture-absorbing region at the bottom of the desiccant. The net effect of these two operations is to increase the temperature of the desiccant 15 by the greatest amount in its bottom region and by progressively smaller amounts as the top region is approached. This general temperature distribution is highly desirable because it results in the maximum temperature being developed where most needed for reactivation, while maintaining the upper region at a minimum temperature. By maintaining the upper region at a minimum temperature, its moisture-adsorbing efficiency is maintained at a high level. Thus, if it should be necessary to turn around from reactivation to drying with no intervening delay, the upper region of the desiccant will be in a condition to effectively adsorb moisture. As a result, the upwardly flowing air emerges therefrom in the desired dry condition.

There are a number of factors which contribute to the reduced temperature of the desiccant in its upper region. One is the fact that the heat from heater 40 is applied directly to the lower portions of the desiccant and not to the upper portion. Another is the fact that the reactivating air flows in a downward direction through the desiccant. Since this air is coolest when it enters the desiccant at its top, it will produce its maximum cooling effect in the upper region of the desiccant. As the reactivating air travels downwardly through the desiccant, it becomes progressively hotter and thus becomes less effective in cooling the desiccant when it enters the bottom region of the desiccant.

It should be appreciated that it is not enough merely to maintain the upper region of the desiccant cooler than the lower region. The absolute temperature of the upper region must also be limited if the desiccant in this region is to retain its high moisture-adsorbing efficiency. For this reason, we impart only a small amount of heat to the desiccant. For example, in a preferred form of the invention, we limit the heat input to such a value that, for typical ambient temperatures, the temperature rise of the lower region of the desiccant is only about 50 degrees F. above ambient temperature after five hours of reactivation. The upper region of the desiccant at this time is only about 20 degrees F. above ambient. By limiting the temperature of the upper region of the desiccant to such low values, it will be apparent that relatively cool desiccant is always available to adsorb the moisture should the dryer be turned around from reactivation to drying at any point in a reactivation cycle.

In prior reactivating schemes, it has been customary to heat the entire body of the desiccant to many hundreds of degrees Fahrenheit, for example, to levels as high as 600 degrees F. In practicing our invention, we limit the temperature rise even in the hottest portion of the desiccant body, i.e., the lowermost portion, to about 100 degrees F. above ambient, and preferably even less. With the moderate heating that we employ, the upper region of the desiccant body is kept sufficiently cool to allow a turn around from reactivation to drying without saturating the initial air output from the dryer. As another measure of the coolness of the upper region during reactivation, within five minutes of dryer operation begun immediately upon termination of reactivation, the relative humidity of the air output from the dryer is below five percent.

The downward flow of reactivating air not only helps maintain the upper regions cooler than the lower regions but it also helps confine the moisture in the desiccant to its lower regions. In this respect, recall that normal drying operation had made the desiccant at the bottom the wettest. During reactivation, as this bottom portion releases its moisture in response to heat, the downwardly-moving reactivating air passing through the bottom portion of the desiccant carries this moisture in a downward direction out of the desiccant without permitting it to enter the relatively dry desiccant in the upper region. The leading edge of the saturated region of desiccant, which had advanced upwardly during drying, is forced to retreat in a downward direction until even the lowermost portion of the desiccant has regained its high moisture-adsorbing efficiency. By thus maintaining the upper region of the desiccant drag, as well as cool, its moisture-adsorbing efficiency is maintained at a high level throughout the reactivation cycle. This further contributes to its immediate availability for drying duty should it be necessary to turn around from reactivation to drying at any point in the reactivation cycle.

An important advantage of directing the normal air flow in an upward direction is that this decreases the possibility that any liquid that might possibly have collected or formed in the desiccant will find its way past the desiccant to the output side of the dryer. For example, assume that, for some unusual reason, liquid had collected in the desiccant. Gravity would force it to flow to the bottom of the dryer, assuming no air was then flowing upwardly therethrough. Since this bottom is the input side of our dryer, when normal flow was resumed, the desiccant would still be ahead of this liquid to prevent its entry into the critical portion of the system located downstream therefrom. But if the output, instead of the input, of the dryer were located below the desiccant, such liquid as escaped from the desiccant would flow by gravity to the output side of the dryer. When normal air flow through the desiccant was resumed, this liquid would be carried by the air into the system, thus defeating the purpose of the dryer.

It is to be noted that our heating element 40 is located outside the vessel 14 rather than inside. This is particularly advantageous in a high pressure system because it eliminates the need for expensive seals in the regions where an internally located heating element would extend through the walls of the vessel. In one form of our invention, the normal pressure inside the dryer 11 and the air receiver 13 during a drying cycle is 2000 p.s.i. So it will be apparent that high quality seals would be needed for an internally-located heating element.

Most dryer installation employ two dryers, one of which is adapted to be reactivated while the other is being utilized for drying purposes. With our reactivating arrangement, we are able to eliminate one of these dryers and to rely upon only a single dryer. To this end, we operate our dryer 11 on a 50% duty cycle. In other words, reactivation takes place for the same length of time as drying. In this regard, the heat input from the heater to the desiccant is made high enough so that the desiccant can be restored to its original condition by reactivation for a period equal to or less than the drying period. A suitable control (not shown) is provided for controlling reactivation so that it continues for the same period as was previously used for drying. This control is suitably set so that it will not initiate a reactivating operation until drying has occurred for a predetermined minimum period, preferably about five hours, as pointed out hereinabove. Since reactivation will normally continue for the same length of time as drying, i.e., a minimum of five hours, a sufficiently long period is available during reactivation to permit the heater to raise the desiccant temperature to a high enough level to provide for a high rate of moisture release.

A system that our dryer is especially suited for is one which can operate on an intermittent basis, e.g., one hour a day, to maintain the gas receiver 13 at the desired pressure level. Between its normal operating periods, there is sufficient time available to reactivate the desiccant should such reactivation be required. To permit this reactivation normally to occur without interruption, the air flow through the metering device 30 is sufficiently limited to permit reactivation to continue for the desired period without reducing the pressure in tank 13 to a level that results in turn-on of the compressor. However, if for some reason, it is necessary to interrupt the reactivation cycle, the system is capable of immediately thereafter supplying dry air, as was pointed out hereinabove. If there should be a continuous demand for dry air for as long as several days, the system is capable of supplying it since sufficient desiccant is present to allow for hundreds of hours of continuous drying duty under most ambient temperature conditions.

While we have shown and described a particular embodiment of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

1. Air drying apparatus comprising:
   (a) a vessel having an internal space,
   (b) a body of desiccant located within said space and having a long vertical dimension compared to its horizontal dimension,
   (c) means including pumping means for directing air for drying upwardly through said desiccant body comprising an air inlet to said vessel located beneath said desiccant body and an air outlet from said vessel located above said desiccant body, the path of said air flow being substantially vertically upward through said desiccant body so that the leading edge of the principal moisture-adsorbing region of said desiccant advances upwardly from the bottom of said desiccant body as drying proceeds,
   (d) means for reactivating said desiccant after a predetermined period of drying comprising:
      (i) means for directing a stream of initially-dry air in a downward direction through said desiccant body and through said principal moisture-adsorbing region,
      (ii) heating means for heating said desiccant while said initially-dry air is passing therethrough,
   (e) means for causing the temperature rise of the desiccant body during heating to be greater in its lower region than in its upper region comprising means for applying a greater portion of the output of said heating means to the lower regions of said desiccant body than to the upper regions,
   (f) said heating means being so constructed and arranged that its heat output is limited to such an extent that during reactivation the desiccant temperature rise in the lower region of the desiccant body is less than 100° F. above ambient temperature.

2. Air drying apparatus comprising:
   (a) a vessel having an internal space,
   (b) a body of desiccant located within said space and having a long vertical dimension compared to its horizontal dimension,
   (c) means including pumping means for directing air for drying upwardly through said desiccant body comprising an air inlet to said vessel located beneath said desiccant body and an air outlet from said vessel located above said desiccant body, the path of said air flow being substantially vertically upward through said body so that the leading edge of the principal moisture-adsorbing region of said desiccant advances upwardly from the bottom of said desiccant body as drying proceeds,
(d) means for reactivating said desiccant after a predetermined period of drying comprising:
 (i) means for directing a stream of initially-dry air in a downward direction through said desiccant body and through said principal moisture-adsorbing region,
 (ii) heating means for heating said desiccant while said initially-dry air is passing therethrough,
(e) means for causing the temperature rise of the desiccant body during heating to be greater in its lower region than in its upper region comprising means for applying a greater portion of the output of said heating means to the lower region of said desiccant body than to the upper region,
(f) said heating means being so constructed and arranged that its heat output is limited during reactivation to such an extend that the upper region of said desiccant remain sufficiently cool to allow a turn around from reactivation to drying without saturating the initial air output from the dryer.
(g) means for maintaining said upper region of the desiccant body sufficiently cool during reactivation to hold the relative humidity of the air output from the dryer below 5% within five minutes of drying operation immediately following reactivation.
3. The air dryer of claim 2 in which said heating means comprises a heating element located outside said vessel and confined to a location in which the lower portions of said desiccant body are disposed.
4. The air dryer of claim 2:
 (a) in which said heating means comprises a heating element located outside said vessel and confined to a location in which the lower portions of said desiccant body are disposed, and
 (b) in which heat-transfer elements of highly conductive metal are imbedded in the lower portions only of said desiccant, said heat transfer elements contacting said vessel for readily transferring heat therefrom to said desiccant body.
5. The air dryer of claim 2 in which said heating means is so constructed and arranged that the heat output is high enough to restore the desiccant body to its original moisture-adsorbing efficiency if reactivation is continued for the same length of time as an immediately-preceding dryng operation, assuming that the immediately-preceding drying operation persisted for at least five hours and assuming further that the drying operation was performed on air entering the dryer in a saturated condition.

References Cited
UNITED STATES PATENTS

| | | | |
|---|---|---|---|
| 1,714,245 | 5/1929 | Schaefer | 55—208 |
| 2,584,889 | 2/1952 | Latour | 55—62 |
| 2,790,505 | 4/1957 | Dow | 55—62 X |
| 2,955,673 | 10/1960 | Kennedy et al. | 55—33 X |
| 2,975,860 | 3/1961 | Westeren | 55—33 X |
| 3,147,095 | 9/1964 | Kanuch | 55—33 X |
| 3,193,985 | 7/1965 | Siggelin | 55—33 |

REUBEN FRIEDMAN, *Primary Examiner.*